(12) United States Patent
Yu

(10) Patent No.: US 10,389,218 B2
(45) Date of Patent: Aug. 20, 2019

(54) EFFICIENT LAMINATED CORELESS GENERATOR AND MANUFACTURING METHOD THEREOF

(71) Applicant: Renwei Yu, Wuhan (CN)

(72) Inventor: Renwei Yu, Wuhan (CN)

( * ) Notice: Subject to any disclaimer, the term of this patent is extended or adjusted under 35 U.S.C. 154(b) by 0 days.

(21) Appl. No.: 16/114,308

(22) Filed: Aug. 28, 2018

(65) Prior Publication Data

US 2019/0013722 A1 Jan. 10, 2019

Related U.S. Application Data

(63) Continuation of application No. PCT/CN2016/080992, filed on May 4, 2016.

(51) Int. Cl.
| | |
|---|---|
| *H02K 21/24* | (2006.01) |
| *H02K 23/54* | (2006.01) |
| *H02K 16/00* | (2006.01) |
| *H02K 15/03* | (2006.01) |
| *H02K 15/04* | (2006.01) |
| *H02K 1/02* | (2006.01) |

(52) U.S. Cl.
CPC .............. *H02K 21/24* (2013.01); *H02K 15/03* (2013.01); *H02K 15/04* (2013.01); *H02K 16/00* (2013.01); *H02K 23/54* (2013.01); *H02K 1/02* (2013.01)

(58) Field of Classification Search
CPC .......... H02K 1/02; H02K 15/03; H02K 15/04; H02K 16/00; H02K 21/24; H02K 23/54
USPC ............................ 310/156.01, 156.08, 156.25
See application file for complete search history.

(56) References Cited

U.S. PATENT DOCUMENTS

| | | | | |
|---|---|---|---|---|
| 2010/0052458 A1* | 3/2010 | Takeuchi | ............... | H02K 21/24 310/156.37 |
| 2010/0072850 A1* | 3/2010 | Miyata | ................. | H02K 1/2793 310/156.12 |
| 2010/0084938 A1* | 4/2010 | Palmer | ..................... | H02K 3/04 310/156.36 |

(Continued)

FOREIGN PATENT DOCUMENTS

| | | |
|---|---|---|
| CN | 201191799 Y | 2/2009 |
| CN | 102324818 A | 1/2012 |

(Continued)

OTHER PUBLICATIONS

Internation Search Report of PCT/CN2016/080992, dated Feb. 3, 2017.

*Primary Examiner* — Bernard Rojas
*Assistant Examiner* — Rashad H Johnson
(74) *Attorney, Agent, or Firm* — Erson IP (Nelson IP)

(57) ABSTRACT

A generator is provided with stator coils fixed with an outer fixing bracket and rotors driven by a spindle, and the rotors are fixed with the spindle, and both of stator coils and a rotor frame are of disk shapes with the spindle passing through centers therein; one rotor and an adjacent stator coil constitute one kinetic energy conversion unit, a plurality of kinetic energy conversion units are axially aligned through the spindle and successively mounted in a consistent direction to form a laminated generator body; permanent magnets configured in even number and having consistent shapes on a single rotor frame are distributed in a form of regular polygon around an axis, the shape of a single coil is the same as that of the magnet.

7 Claims, 3 Drawing Sheets

(56) References Cited

U.S. PATENT DOCUMENTS

| | | | |
|---|---|---|---|
| 2010/0090553 A1* | 4/2010 | Ritchey | H02K 16/00 310/114 |
| 2010/0225112 A1* | 9/2010 | Hayakawa | H02K 3/28 290/43 |
| 2010/0253085 A1* | 10/2010 | Minowa | H02K 21/24 290/55 |
| 2011/0070108 A1* | 3/2011 | Arita | H02K 9/06 417/410.1 |
| 2011/0175486 A1* | 7/2011 | Sugiyama | H02K 1/22 310/216.041 |
| 2011/0241471 A1* | 10/2011 | Tokizawa | H02K 1/243 310/185 |
| 2011/0254474 A1* | 10/2011 | Saito | B60L 50/16 318/139 |
| 2011/0260566 A1* | 10/2011 | Odvarka | H02K 1/16 310/156.12 |
| 2012/0169161 A1 | 7/2012 | Yu | |
| 2013/0009508 A1* | 1/2013 | Takamatsu | H02K 1/02 310/156.35 |
| 2013/0049512 A1* | 2/2013 | Jung | H02K 21/24 310/156.36 |
| 2014/0265709 A1* | 9/2014 | Berding | H02K 19/20 310/168 |
| 2014/0319950 A1 | 10/2014 | Hough | |
| 2015/0229193 A1* | 8/2015 | Chen | H02K 21/24 310/114 |
| 2015/0349589 A1* | 12/2015 | Takahashi | H02K 1/145 310/257 |
| 2016/0276880 A1* | 9/2016 | Ueda | H02K 21/145 |
| 2016/0352203 A1* | 12/2016 | Kusase | H02K 19/103 |
| 2017/0047821 A1* | 2/2017 | Klassen | H02K 1/20 |
| 2017/0085201 A1* | 3/2017 | Kakihara | H02K 1/08 |
| 2018/0323737 A1* | 11/2018 | Masillamani | H02K 21/22 |
| 2018/0375397 A1* | 12/2018 | Nakayama | H02K 3/345 |
| 2019/0013722 A1* | 1/2019 | Yu | H02K 23/54 |

FOREIGN PATENT DOCUMENTS

| | | |
|---|---|---|
| CN | 103683767 A | 3/2014 |
| CN | 105406668 A | 3/2016 |
| JP | 2014131456 A | 7/2014 |

\* cited by examiner

EFFICIENT LAMINATED CORELESS GENERATOR AND MANUFACTURING METHOD THEREOF

CROSS-REFERENCE TO RELATED APPLICATIONS

This application is a continuation of International Patent Application No. PCT/CN2016/080992 with a filing date of May 4, 2016, designating the United States, now pending. The content of the aforementioned application, including any intervening amendments thereto, is incorporated herein by reference.

TECHNICAL FIELD

The disclosure relates to a generator technology, and particularly to an efficient laminated coreless generator and a manufacturing method thereof.

BACKGROUND OF THE PRESENT INVENTION

The current small-size generators widely use column type generators, a center is manufactured into a rotor with coils, single coils on a side wall cut magnetic force lines, the generators consume a large amount of copper, inner rotors are difficult to radiate, irreversible demagnetization occurs at high temperature if permanent magnets are used in the rotors, and thus the performance of the generator is reduced, a stator assembly is difficult to radiate, and the size of the stator is limited.

A disk type electric machine was invented by Faraday in 1821, stators and rotors of the disk type electric machine are of plane disk structures, and the stators and the rotors are axially and alternatively arranged. Due to limitation of materials and technological level at that moment, the disk type electric machine cannot be further developed. With the increasingly outstanding of energy and environment problems, the new energy has gradually become the focus of people's attention. Especially, wind electricity, as one of new energy industries having the most mature and commercialized development prospect at the present stage, has gained high concern and attention from governments of all countries and companies. Especially for a small-size wind turbine system, it is high in maneuverability and flexible to use, not only has a wide development prospect in remote areas, such as pasturing areas, fishing boats and sea islands, but also has incomparable advantages on small-power electric equipment for urban illumination, monitoring and the like. The disk type electric machine is simple and compact in structure, small in volume and high in torque density, especially, for a disk type permanent magnet electric machine with a double-outer rotor stator-free core, cogging torque and stator iron loss are eliminated, pull-in torque is low, and efficiency is high; a power machine can be directly mounted on the outer rotor, and the system is simple and reliable.

The magnetic flux density and the power density of the disk type stator of the existing laminated generator still need to be further improved. Although a superposition use solution of a disk type electrical machine has been proposed, there are no distinct basis and parameter conclusions rendering the disk type electric machine to surpass the traditional cylinder type generator in the aspects of use and effects. The structure requirements of the laminated generator are slightly different from those of a disk type motor in that the laminated generator drives the rotors to rotate with relatively small rotational inertia to the greatest extent and outputs electric energy, and its volume and weight are as small as possible so as to facilitate application.

SUMMARY OF PRESENT INVENTION

The technical problem to be solved by the disclosure is to provide an efficient laminated coreless generator which is capable of outputting bigger power in unit volume or weight and whose power density obviously exceeds power densities of the existing laminated generator and drum type generator.

In one aspect, the efficient laminated coreless generator is provided with a stator coil fixed with an outer fixing bracket and a rotor driven by a spindle; the rotor is fixed with the spindle, the stator coil is provided with a coil holder, the coil holder is provided with a plurality of disk-shaped single coils, the rotor is composed of a rotor frame and a permanent magnet fixedly embedded into the rotor frame, the rotor frame is fixed with the spindle, and the coil holder and the rotor frame are both in disk-shaped shapes with the spindle (1) passing through centers therein; the outer fixing bracket is made of an antimagnetic material, and only the rotor in a magnetism-guided loop is a magnetizer; one rotor frame and one adjacent coil holder constitute one kinetic energy conversion unit at a set interval, at least 3 kinetic energy conversion units having the same structure are axially aligned and mounted in a consistent arrangement sequence to form a laminated generator body; permanent magnets on a single rotor frame are configured in even number, and centrally and symmetrically distributed in a form of regular polygon around an axis; the surface magnetism intensity of the permanent magnet at least is 3700 Gs, when the permanent magnet is of a round cylinder, a ratio d/h of the maximum size d of a single permanent magnet in a radial direction to a thickness h of the laminated generator body is 2~2.65, and when the permanent magnet is of a sector-shaped cylinder, a ratio d/h of the maximum size d of a single permanent magnet in a radial direction to a thickness h of the laminated generator body is 2.13~2.66; a ratio of a cross sectional area of the magnet to a cross sectional area of the rotor frame is less than or equal to 1 and larger than 0.5, and a ratio of a volume of the single coils in the laminated generator body to that of the laminated generator body is larger than or equal to 20% and less than or equal to 50%.

An optimized solution of the permanent magnet is as follows: a groove or hole is formed in the axial middle of the radial mounting position of the permanent magnet of the rotor frame, the permanent magnet is fixedly embedded into the groove or hole of the rotor frame, the permanent magnet is 7~100 mm in thickness and 8~220 mm in maximum cross section size.

The permanent magnet is 8~20 mm in typical thickness and is 10~120 mm in maximum typical cross section size.

Preferably, the single coil is wound in a form of disk in a single layer or multiple layers, a quantity of single coils in each kinetic energy conversion unit is the same as that of the permanent magnets, the shape of each single coil is the same or similar to that of the permanent magnet, and the arrangement structure of the single coils in the coil holder is consistent with that of permanent magnet in the rotor frame; a cross section of the single coil is of a round shape or a sector shape.

Further, the single coil in each coil holder is formed by superposing two layers of disk-shaped coil disks, the number of turns of each coil disk is 4 circles or less than 4 circles, coil disks in the same coil holder are successively connected in series, all the coil disks are connected in series to form a single-phase winding, a connection line between adjacent single coils is arranged outside the winding in a circle shape, and a wire-outgoing end and a wire-incoming end of the winding are arranged outside the winding.

An application embodiment having an outstanding effect is as follows: the permanent magnet is a super magnet, and the single coil uses a graphene material.

Typically, each kinetic energy conversion unit is provided with 6 permanent magnets embedded into the rotor frame, and each coil holder is provided with 6 single coils; a cross section of a lead of the single coil is of a rectangle.

An embodiment is as follows: the single coils are corelessly wound and outsides of end surfaces of two sides thereof are covered and fixed by the side wall of the coil holder, two end surfaces and the outer sides of the sides of the rotor frame are provided with space-stop racks fixed with the outer fixing bracket, and a distance between the rotor frame and the coil holder is 0.3~3 mm.

In another aspect, a method for manufacturing above efficient laminated coreless generator, comprises the following steps:

(1) Manufacturing an outer fixing bracket and a stator coil using an antimagnetic material, and processing a spindle and a rotor; wherein, the stator coil is manufactured as follows: even numbers of disk-shaped single coils are fixed on a disk-shaped coil holder with a center through hole so that a regular polygon is surrounded by the single coils with the center through hole as a center, a cross section of a lead of the single coil is of a rectangle, and a lead is introduced from the outer side of the single coil and extracted from a terminal; each single coil is wound in a double-layer coil disk, and one layer of coil disks performs spiral winding by no more than 4 circles and another layer of coil disks starts winding, then the coil disk is connected to an adjacent single coil from one side of the single coil adjacent to the center through hole, or the coil disk is extracted from one side far away from the center through hole after the single coil on the coil holder is wound; the rotor is manufactured as follows: permanent magnets which are flat and consistent in thickness are fixedly embedded into the disk-shaped rotor frame so that the end surfaces of the permanent magnets are parallel to the end surface of the rotor frame, the permanent magnets and the single coils are consistent in number and arrangement and identical or similar in shape, and the magnetic poles of the permanent magnets on one rotor frame are opposite;

(2) Alternatively mounting rotors and stator coils at setting positions of the spindle at intervals, wherein, the stator coils are fixed with the outer fixing bracket, the rotors are fixed with the spindle, the permanent magnets on each rotor frame are axially aligned and the permanent magnets in the same axial direction are consistent in pole direction;

(3) Mounting the spindle on the outer fixing bracket at its two ends via a bearing; and (4) Connecting all the terminals outside the single coils.

A mounting manner is as follows: a space-stop rack isolating the external from two ends and the outer side of the rotor frame sleeves outside the rotor frame, a groove is connected between the rotor frame and the space-stop rack through balls or through a bearing, a thickness of one space-stop rack is thicker than that of one rotor frame by 0.4 mm~4 mm, and the space-stop rack is fixed with the outer fixing bracket.

The coil holder is provided with 6 single coils, the permanent magnets and the single coils are manufactured into round cylinders, or the permanent magnets and the single coils are manufactured into sector-shaped cylinders; the side of the rotor frame is provided with fasteners fixing the permanent magnets in the rotor frame.

By long-term numerous practice, the applicant utilizes superposed magnetic field advantages of the multi-layer laminated generator, since each group of stator windings can additionally obtain superposition of magnetic forces of adjacent kinetic energy conversion units under the definitive structure conditions, the change rate of magnetic flux is greatly increased, and the output power is significantly promoted. Especially, the output power of the multi-layer laminated generator is improved by at least twice or more under the condition of the disclosure. An experimental test indicates that the output flux-density of a double-layer kinetic energy conversion unit is increased by 2.54 times as compared with that of the laminated generator having a single-layer structure, the output flux-density of a three-layer kinetic energy conversion unit is improved by 5% as compared with that of a laminated generator having a double-layer structure, and the output flux-density of a four-layer kinetic energy conversion unit is still increased by 1% as compared with that of a laminated generator having a three-layer structure. Meanwhile, the output efficiency of a multi-layer laminated generator is also greatly improved, and the output efficiency of a common generator (with power below 3 kw) using a conventional material can reach up to 60%. However, through actual testing, the output efficiency of the multi-layer laminated generator using the technical solution of the disclosure can reach 85% or more.

The output power density in the technical solution of the disclosure is significantly improved. Under the conditions that main components use the same universal material and the permanent magnet uses neodymium iron boron (N40H), compared with power density per unit volume, the power density of a common column type three-phase asynchronous generator is about 2.8 VA/cm$^3$, and the power density of the generator in the technical solution of the disclosure is more than 11.3 VA/cm$^3$ (test parameters, output 220V, 15 A). Compared with the power density per unit mass, the power density of the common column type three-phase asynchronous generator is 0.13 KVA/Kg, the power density of a common disk type generator is about 1 KVA/Kg, and the power density of the generator in the technical solution of the disclosure is not less than 0.6 KVA/Kg.

The disclosure explicitly proposes a coreless multi-layer laminated electric machine which achieves effectively improved output power utilizing specially designed magnetic lines and regular magnetic field superposition, and practical particular conditions and a value range which allow its cost to be reduced, for the first time. Basic conditions for greatly improving the output efficiency and the power volume ratio of the multi-layer laminated generator are disclosed, application parameters for greatly improving the power density of a laminated generator are explicitly disclosed for the first time, and its output power density obviously exceeds the existing disk type generator.

According to the disclosure, many significant improvements completely different from the traditional technology are made to the structure of the laminated generator. The outer shell does not use a permeability magnetic material, a magnetic loop of the traditional disk type generator programmed by a shell and an iron core is completely changed, and magnetism is conducted without the iron core, thereby reducing weight, decreasing volume and diminishing eddy-current loss and magnetic loss. Magnetic force lines are obviously regularized under the limitation of a structure through interaction between superposed magnetic fields, instead, magnetic flux is increased, and the inductance of the coil is greatly reduced so that output current is effectively improved.

Only 4 circles or less than 4 circles of coils are used, a distance between magnets is shrunk to the greatest extent and output current is improved. Limitation is made to the basic structure of the multi-layer laminated generator through an area ratio and a d/h ratio of a permanent magnet, and is a guarantee of magnetic flux of the stator coil of the laminated generator of the disclosure as well. Limitation of surface magnetism and coil ratio is a condition for obviously improving the power output efficiency. The proportion of the coils is achieved by using a manner of winding coils, and a large amount of experiments show a winding manner of filling hollow disk type coils is more efficient than a manner of only winding on edges as to improvement of output power. Limitation of the number of circles of the coil reduces reactance and improves output current, and is beneficial to increasing the cross section area of a lead, further improves output current, and increases conversion efficiency.

Disk-shaped winding of coils can reduce axial thickness under the condition of increasing a wire diameter, the coil adopts rectangular lines so that by utilizing original space, output current is improved to the greatest extent, and internal resistance and temperature rise are reduced; only two layers of adjacent single coils are set so that a lead winding into an inner coil can right wind to an outer coil again, and then is connected to an adjacent coil through the insides of a plurality of arranged single coils, and therefore, through this process structure, an axial distance is maximally reduced and output power is improved. Although this winding method reduces the number of turns of coils, the output current is greatly improved, the tiny multi-layer rotor distance greatly promotes the intensity of a magnetic field, indirectly promotes the output of an electrodynamic potential and meanwhile reduces the application amount and the output reactance of the coil material.

The permanent magnet is embedded into the rotor frame to be mounted, which avoids a manner of respectively mounting at two sides of the rotor frame, shortening the axial length and reducing a volume, and facilitating extension of a magnetic region range and enhancement of the intensity of the magnetic field. In the solution of the disclosure, a surface magnetic intensity value of 3700 Gs is a boundary value obtained on the premise of a large amount of experiments.

Fixed single coils using super magnets and graphene materials do not only rely on selection of materials, the super magnet is a special term and material whose magnetic intensity is 10 times as that of the ordinary magnet. Since the magnetic force of the super magnet is strong, the general core structure is difficult to mount, and the core and the permanent magnet itself can be bent due to strong magnetic force during use, so the general core structure cannot be applied in the existing disk type electrical machine; however, in the solution of the disclosure, since the coreless structure is used, this problem is avoided, and therefore a super-small-volume large-output-power generator is possible. The graphene material has the advantages of high strength, good heat dissipation and good conductivity, but is difficult to popularize due to its expensive price, the stator wound by using extremely few coils of the disclosure can especially play a special role in application, thereby promoting the loading ability of a wire. By using a high-temperature wire, a super magnet, graphene and other materials, the power intensity can be promoted by 20 times, and a megawatt-grade leap is achieved under the equivalent volume and equivalent mass, which cannot be achieved in other column type or disk type generators at present, even though a new material is used.

In a further improvement, the permanent magnet having the same round cross section and the single coil can normalize waveform output, especially, 6 round permanent magnets and coils are used so as to obviously improve the output efficiency while reducing process cost. Experiments prove that the round magnet can reach an effective magnetic field stronger than magnetic fields of other shaped magnets having similar area or larger area, and meanwhile, fewer materials are used; use of single-phase output avoids counteraction of electrodynamic potential between multi-phase outputs, serial connection between single coils in one coil holder and even permanent magnets are of a specially designed single-phase output structure. The whole structure obviously improves output power under the condition that a volume is not increased. According to experimental data, the output power density of the disk type generator having the structure of the disclosure is at least 2.54 times that of a single-layer disk type generator, and is more than 3 times that of the traditional column type generator.

In drawings, 1—rotor, 2—outer fixing bracket, 3—rotor frame, 4—permanent magnet, 5—coil disk, 6—kinetic energy conversion unit, 7—bearing, 8—coil holder, 9—single coil, 10—space-stop rack, 11—lead.

DETAILED DESCRIPTION OF PREFERRED EMBODIMENTS

Figure 1:
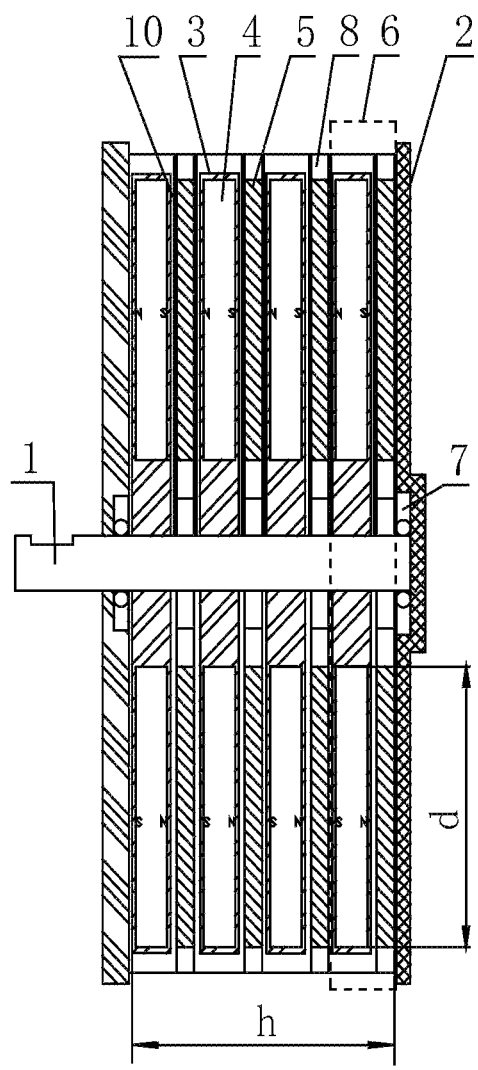
FIG. 1 is a structural diagram according to an embodiment of the disclosure.

The disclosure will be further described in combination with drawings and embodiments. As shown in FIG. 1, the efficient laminated coreless generator is provided with a stator coil fixed with an outer fixing bracket 2 and a rotor driven by a spindle 1, the stator coils and the rotors are alternatively and axially arranged. The rotor is embedded into a rotor frame 3 of a permanent magnet, the rotor frame 3 is fixed with the spindle 1, and both of the stator coil and the rotor frame 3 are of disk shapes with the spindle (1) passing through centers therein 1. The laminated generator is different from a column type generator in that coils and rotors are arranged on an axial disk surface, the rotors are axially arranged, the outer fixing bracket uses an antimagnetic material so as to aggregate magnetic force lines to form a sealed circle between the axially arranged permanent magnets, the rotor is rotated so that the coils transversely cut the magnetic force lines to generate electrodynamic potential. The permanent magnet is embedded into the rotor frame and fixed from the side, and the rigidity of the rotor frame can be kept unchanged when the disk surface is large.

The intensity of the magnetic field of the used permanent magnet is not larger than that of an electromagnet, but the used permanent magnet is simple in structure, reliable to operate, small in volume, light in mass, small in loss and high in efficiency, and does not need a collecting ring and a brush gear, thereby reducing failure rate.

The stator coil is formed by fixing a circle of disk-shaped single coils 9 on the coil holder 8, one rotor and one adjacent stator coil constitute one kinetic energy conversion unit 6, a plurality of kinetic energy conversion units 6 are axially aligned through the spindle 1 and successively mounted in a consistent direction to form a laminated generator, consistence of direction refers to a fact that arrangement sequences of rotors and stator coils are consistent, and the orientations of end surfaces of the rotors and the stator coils are consistent. By the laminated generator which is used in multi-layer superposition, an inventor performs a large amount of practice for 6 years, the magnetic field superposition advantage of the multi-layer laminated generator is utilized, since each group of stator windings can additionally obtain superposition of magnetic forces of adjacent kinetic energy conversion units, the change rate of magnetic flux is greatly increased, the output power is significantly promoted, the output power of the multi-layer disk type generator is improved by at least twice or more under the condition of the disclosure.

Figure 2:
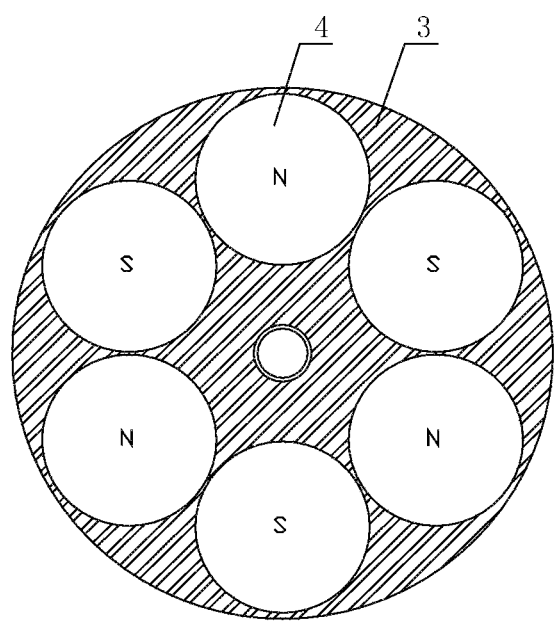
FIG. 2 is a structural diagram of an arrangement structure of a rotor according to an embodiment of the disclosure.

As shown in FIG. 2, permanent magnets configured in even number on a single rotor frame are distributed in a form of regular polygon around an axis; in the embodiment indicated in the drawing, 6 permanent magnets are arranged in one rotor frame, a quantity of the single coils distributed in a cross section form in each kinetic energy conversion unit 6 is identical to that of the permanent magnets, and both are 6. The magnetic pole directions of the adjacent permanent magnets on the same rotor frame are opposite, and the directions of the permanent magnets on the adjacent rotor frames in the same axial direction are consistent. Since the outer fixing bracket uses an antimagnetic material, magnetic force lines are distributed as circulating between the permanent magnets in the outer fixing bracket, when a distance between permanent magnets in the axial direction is close enough, the magnetic force lines are mainly focused between the permanent magnets in the axial direction to pass.

The permanent magnet is 8~20 mm in typical thickness and 10~120 mm in the maximum size of the typical cross section. After a technology of yield force resistance is progressed, the permanent magnet can be extended to 7~100 mm in thickness and 8~220 mm in the maximum size of the typical cross section.

Figure 3:
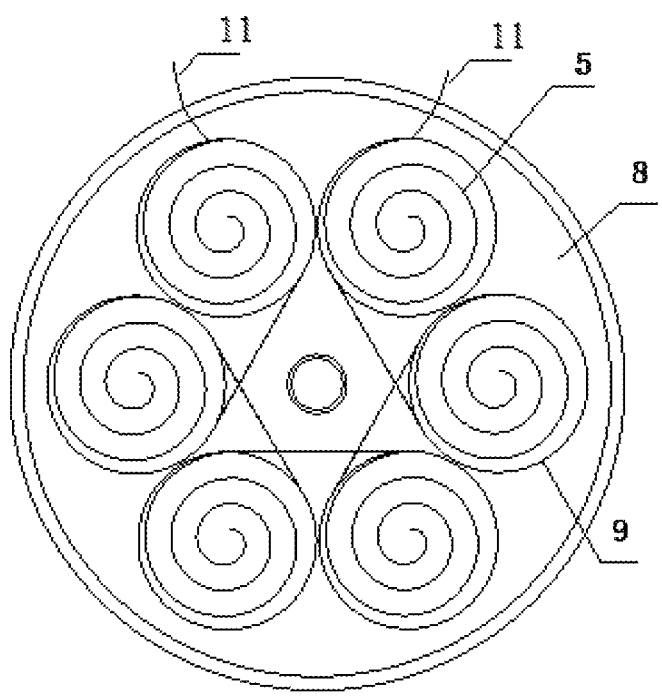
FIG. 3 is a schematic diagram of an arrangement structure of a single coil according to an embodiment of the disclosure.

As shown in FIG. 3, the single coils are fixed on the coil holder 8, a plurality of disk-shaped single coils are placed on a cross section of each coil holder, leads in the single coil fully wind around the single coil without remaining holes or tiny middle holes are left, the shape of each single coil is similar to that of the permanent magnet, and both are of round shapes having the same or similar diameter, positions are aligned axially, each kinetic energy conversion unit 6 is provided with 6 permanent magnets, 6 single coils are arranged on the cross section in a disk form. As shown in the drawing, the single coils are wound in a disk form, the single coil in each coil holder is axially provided with two layers of coil disks 5. The coil disks 5 in each coil holder are successively connected in series to form a single-phase winding. A thickness is reduced in only 4 circles or less than 4 circles of coils, the coils are wound in one plane, a cross section of a lead is of a rectangle, the wire diameter having a larger cross section area can be used to improve the output current, facilitate the shortening of the distance between kinetic energy conversion units and utilizing the magnetic fields of adjacent magnets to the greater extent.

An experiment indicates that the magnetic field of the round permanent magnet is concentrated more than the magnetic fields of the permanent magnets having sector shapes or other irregular shapes, the intensity of the magnetic field of its center is higher, and the output waveforms generated after the coils cut the magnetic force lines are regular, electrical appliances cannot be damaged because of irregular output waveform.

The surface intensity of the permanent magnet at least is 3700 Gs and reaches the intensity of the ordinary neodymium iron boron magnet; under the condition that the shape of a cross section of the permanent magnet is a round shape, a ratio d/h of the maximum size d of the single permanent magnet in a radial direction to a thickness h of the laminated generator body is 2~2.65; under the condition that the shape of a cross section of the permanent magnet is a sector shape, a ratio d/h of the maximum size d of the single permanent magnet in the radial direction to a thickness h of the laminated generator body is 2.13~2.66; at least three layers of kinetic energy conversion units are arranged in the laminated generator body, a ratio of the area of the magnet to a cross sectional area of the rotor frame is less than or equal to 1 and larger than 0.5, a ratio of a volume of the single coil 9 in the laminated generator body to a volume of the laminated generator body is larger than or equal to 35% and less than 50%, which are conditions for meeting efficient output and large power density.

The ratio d/h in the generator is different from that in a motor. In the generator, the rotational inertia is reduced, and the diameter of the rotor is small. In addition, it is needed that balancing is performed between enhancement of rotors and stator coils and enhancement of magnetic field intensity through superposition of multiple layers of magnetic fields.

The number of layers of the kinetic energy conversion unit are set according to requirements of application and requirements of structure intensity, may reach up to dozens of layers, or hundreds of layer on the premise of advanced process.

The coil holder 8 is fixed with the outer fixing bracket 2 made of the antimagnetic material, the outer fixing bracket is simultaneously used as an end cover of the generator, and only the laminated generator body and a bearing 7 are arranged in the outer fixing bracket. The outer fixing bracket does not use a permeability magnetic material, and is different from all the generators at present in structure, this structure changes the direction of a magnetic circuit, a closed main magnetic force line loop is formed utilizing axially arranged permanent magnets, but the magnetic flux is not reduced.

In an embodiment, a method for manufacturing the laminated coreless generator includes the following steps:

(1) Manufacturing a spindle, manufacturing an outer fixing bracket 2, a single coil 9 and a space-stop rack 10 using an antimagnetic material, processing flat and round permanent magnets having the same shapes, setting the consistent thicknesses and diameters of the permanent magnets according to different output powers; wherein, the permanent magnet can adopt a neodymium iron boron magnet and meets a surface intensity of at least 3700 Gs.

The single coil is manufactured as follows: 6 disk-shaped single coils 9 are arranged on a disk-shaped coil holder 8 with a center through hole, the diameter of the single coil is basically consistent with that of the permanent magnet so that the single coils symmetrically surround a circle with a through hole as a center, a cross section of a lead of the coil is of a rectangle, and a lead 11 is introduced from the outer side of the single coil and extracted from a terminal.

Each single coil is wound in two layers, each layer is spirally wound by 3~4 circles on the same plane, is wound from the outer layer to the center and then enters into another layer of plane for spiral winding out, the profiles of two layers of coils coincide, a lead is connected to an adjacent single coil from the inner side of the single coil, and finally winds out from the outer side of the single coil; fixing positions are set in the coil holder for placing single coils, the wound single coils are adhered to the end surface and the periphery of the coil holder with resin and compressed into a regular shape, so as to be fixed with the adjacent single coil or the outer fixing bracket, and the coil holder plays a role in maintaining sufficient yield.

The rotor is manufactured as follows: permanent magnets are fixedly embedded in the rotor frame, penetration holes are formed in permanent magnet mounting positions of the rotor frame in advance, a check ring is arranged on the end surface of the permanent magnet, a check ring with a cover or a cover plate is fixed on the end surface of the other side. The 6 permanent magnets are set and are of cylinder shapes whose diameter are the same as those of the single coils, and the pole directions of adjacent permanent magnets are opposite; the permanent magnets are fixed in the rotor frame through fasteners from the outer side.

The center of the rotor frame is provided with an axle hole in which a coupler structure having a protruded end surface and used for being fixedly connected with the spindle is set.

The middle of the space-stop rack 10 is provided with a hole into which the rotor frame 3 is placed without contact, a thickness of the space-stop rack is thicker than that of the rotor frame by 1 mm, the space-stop rack can be fixed with the outer fixing bracket through the fasteners at the outer side, the space-stop rack is connected with the rotor frame through a bearing, or a structure of balls and a ball groove. The space-stop rack functions as separating the rotatable rotor frame from the single coils and modularizing the rotor to facilitate standard mounting, the rotors and the stators are alternatively mounted on the spindle, and meanwhile heat dissipation is facilitated since rotation of the rotor frame causes a negative pressure region to drive air flow between a gap and the external to flow and radiate. However, the pole directions of the permanent magnets on all the rotors are kept consistent in the axial direction.

(2) Connecting the spindle with the outer fixing bracket at one side through a bearing.

(3) Alternatively and closely mounting rotors with space-stop racks and stator coils with single coils along the spindle, fixing the rotors with the spindle, fixing the space-stop racks with the outer fixing bracket or the coil holders, and mounting the rotors within a profile range of the space-stop racks, wherein, the pole directions of all the rotors in the axial direction are consistent; placing in the outer fixing bracket connected through the bearing at another side after mounting the rotors and the stator coils.

(4) Connecting terminals outside the stator coils according to setting so that all the stator coils are mutually connected in series in turn to form a single-phase output generator, or a multi-output terminal.

I claim:

1. An efficient laminated coreless generator, comprising a stator coil fixed with an outer fixing bracket (2) and a rotor driven by a spindle (1), wherein, the stator coil is provided with a coil holder (8), the coil holder is provided with a plurality of disk-shaped single coils (9), the rotor is composed of a rotor frame (3) and a permanent magnet fixedly embedded into the rotor frame (3), the rotor frame (3) is fixed with the spindle (1), the coil holder (8) and the rotor frame (3) are both in disk-shaped shapes with the spindle (1) passing through centers therein;

the outer fixing bracket is made of an antimagnetic material, and only the rotor in a magnetism-guided loop is a magnetizer;

one rotor frame (3) and one adjacent coil holder (8) constitute one kinetic energy conversion unit (6) at a set interval, at least 3 kinetic energy conversion units (6) having the same structure are axially aligned and mounted in a consistent arrangement sequence to form a laminated generator body; permanent magnets (4) on a single rotor frame are configured in even number, and centrally and symmetrically distributed in a form of regular polygon around an axis;

the surface magnetism intensity of the permanent magnet at least is 3700 Gs, when the permanent magnet is of a round cylinder, a ratio d/h of the maximum size d of a single permanent magnet in a radial direction to a thickness h of the laminated generator body is 2~2.65, and when the permanent magnet is of a sector-shaped cylinder, a ratio d/h of the maximum size d of a single permanent magnet in a radial direction to the thickness h of the laminated generator body is 2.13~2.66; a ratio of a cross sectional area of the magnet to a cross sectional area of the rotor frame is less than or equal to 1 and larger than 0.5, and a ratio of a volume of the single coils (9) in the laminated generator body to a volume of the laminated generator body is larger than or equal to 35% and less than or equal to 50%.

2. The efficient laminated coreless generator according to claim 1, wherein, a groove or hole is formed in the axial middle of the radial mounting position of the permanent magnet on the rotor holder, the permanent magnet is fixedly embedded into the groove or hole of the rotor frame, and the permanent magnet is 7~100 mm in thickness and 8~220 mm in maximum cross section size.

3. The efficient laminated coreless generator according to claim 1, wherein, the single coil (9) is wound in a form of disk shape in a single layer or multiple layers, a quantity of single coils in each kinetic energy conversion unit (6) is the same as that of the permanent magnets, the shape of each single coil is the same or similar to that of the permanent magnet, and the arrangement structure of the single coil in the coil holder is consistent with that of permanent magnet in the rotor frame; a cross section of the single coil is of a round shape or a sector shape.

4. The efficient laminated coreless generator according to claim 3, wherein, the single coil (9) in each coil holder (8) is formed by superposing two layers of disk-shaped coil disks (5), the number of turns of each coil disk is 4 circles or less than 4 circles, coil disks (5) in the same coil holder (8) are successively connected in series, all the coil disks are connected in series to form a single-phase winding, a connection line between adjacent single coils is arranged inside the winding in a circle shape, and a wire-outgoing end and a wire-incoming end of the winding are arranged outside the winding.

5. The efficient laminated coreless generator according to claim 1, wherein, the permanent magnet is a super magnet, and the single coils use a graphene material.

6. The efficient laminated coreless generator according to claim 1, wherein, each kinetic energy conversion unit (6) is provided with 6 permanent magnets embedded into the rotor frame, and each coil holder (8) is provided with 6 single coils (9); a cross section of a lead of the single coil is of a rectangle.

7. The efficient laminated coreless generator according to claim 1, wherein, the single coils are corelessly wound and outsides of end surfaces of two sides thereof are covered and fixed by the side wall of the coil holder, two end surfaces and the outer sides of the rotor frame (3) are provided with space-stop racks (10) fixed with the outer fixing bracket (2), and a distance between the rotor frame and the coil holder is 0.3~3 mm.

* * * * *